April 29, 1958
C. W. BREUKELMAN
2,832,420
SCRATCHERS FOR CLEANING BORE HOLES OF OIL WELLS PRIOR TO CEMENTING
Filed Feb. 14, 1955
4 Sheets-Sheet 1
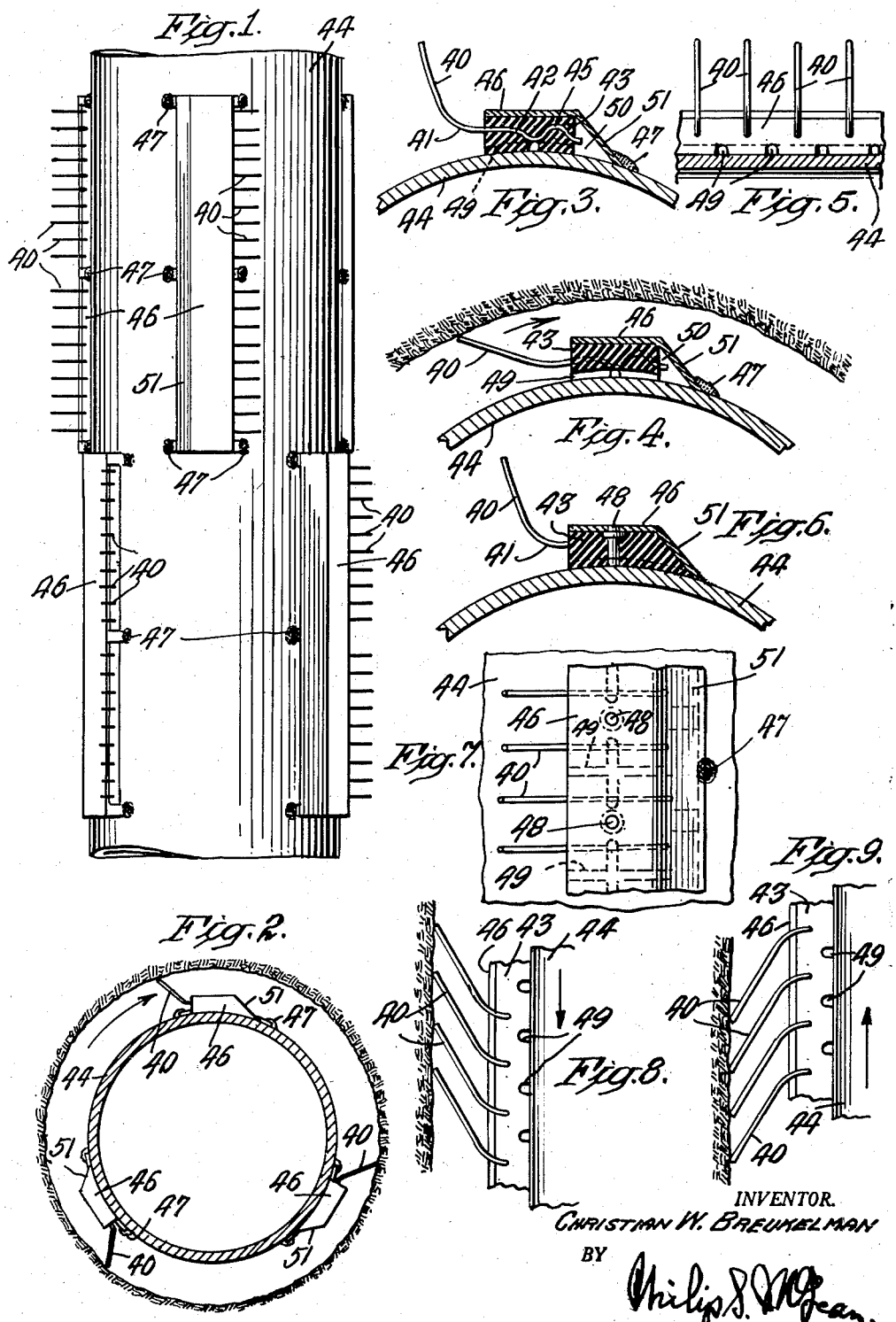
INVENTOR.
CHRISTIAN W. BREUKELMAN
BY
ATTORNEY April 29, 1958
C. W. BREUKELMAN
2,832,420
SCRATCHERS FOR CLEANING BORE HOLES OF OIL WELLS PRIOR TO CEMENTING
Filed Feb. 14, 1955
4 Sheets-Sheet 2
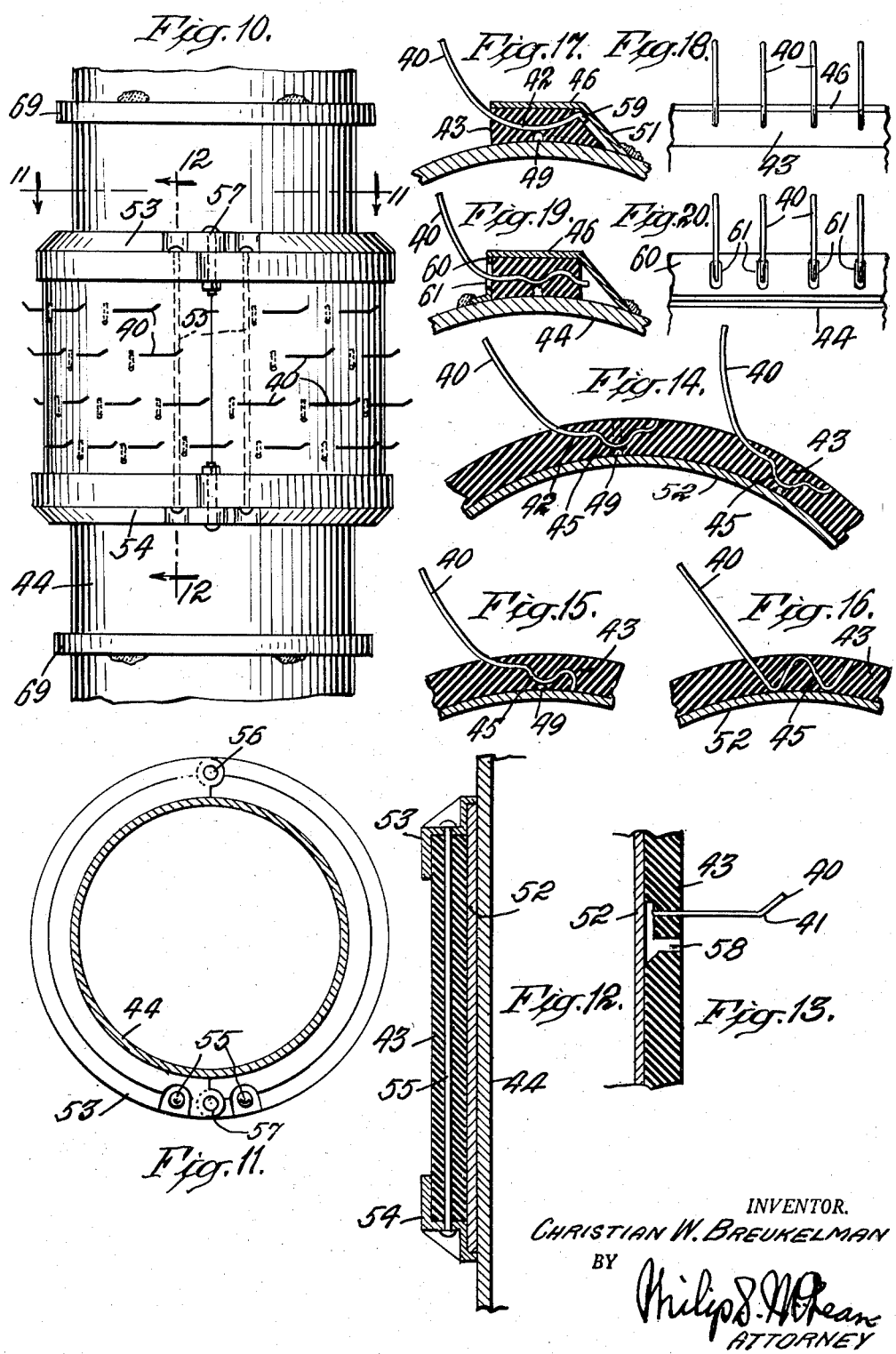
INVENTOR.
CHRISTIAN W. BREUKELMAN
BY
ATTORNEY

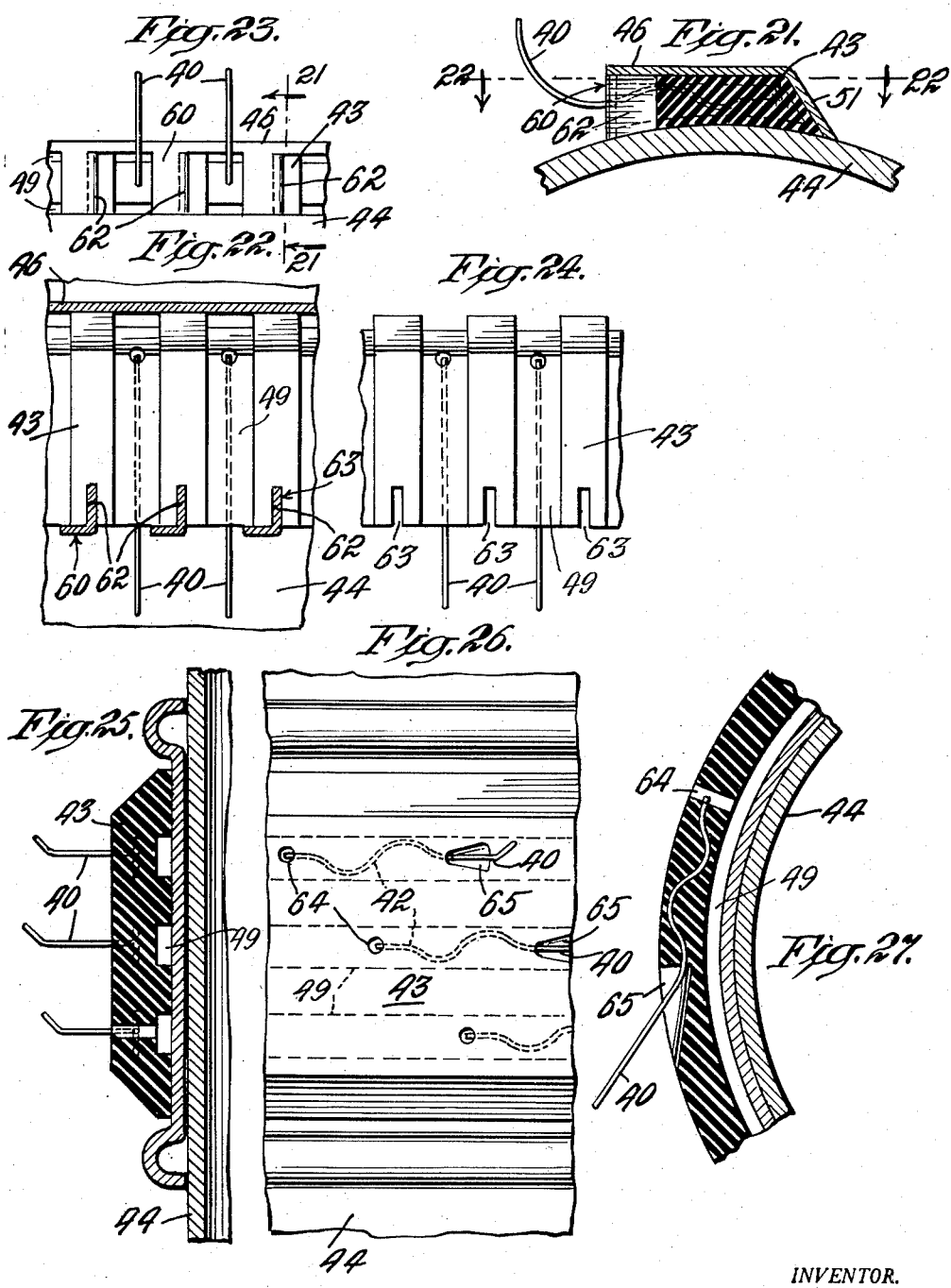

April 29, 1958   C. W. BREUKELMAN   2,832,420
SCRATCHERS FOR CLEANING BORE HOLES OF OIL
WELLS PRIOR TO CEMENTING
Filed Feb. 14, 1955   4 Sheets-Sheet 4
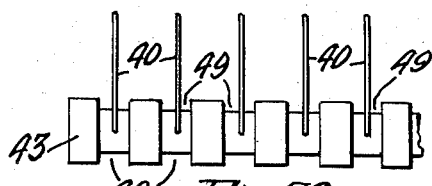
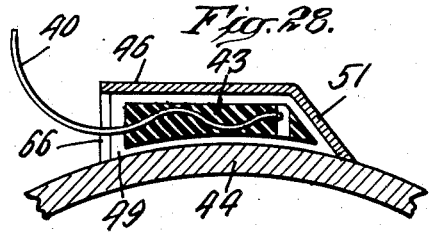
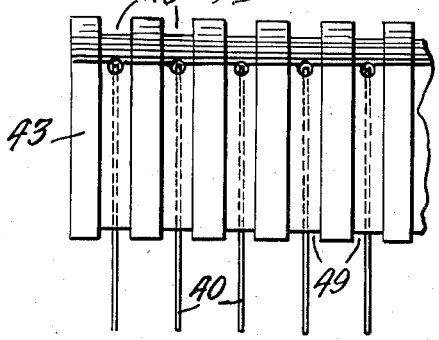
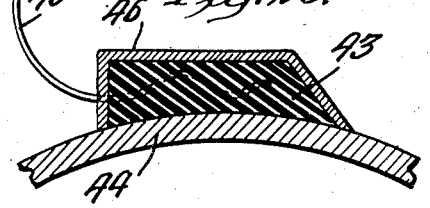
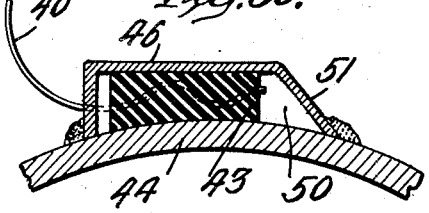
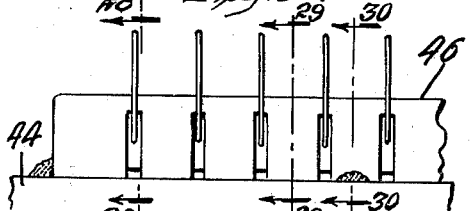
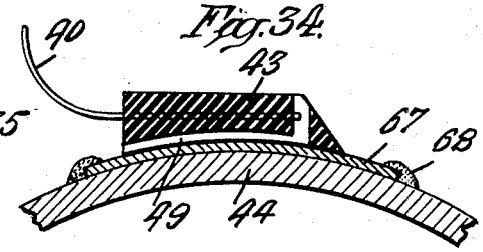
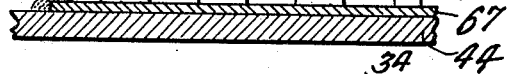
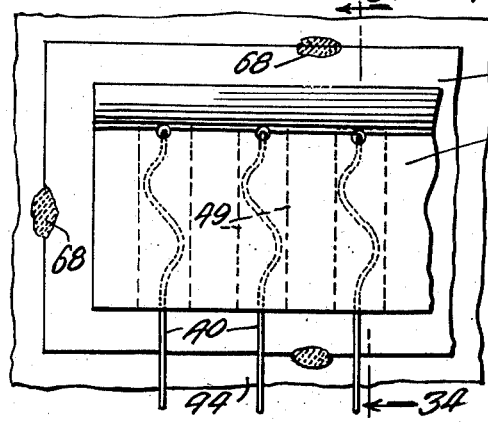
INVENTOR.
CHRISTIAN W. BREUKELMAN
BY
ATTORNEY

United States Patent Office 2,832,420
Patented Apr. 29, 1958

2,832,420

SCRATCHERS FOR CLEANING BORE HOLES OF OIL WELLS PRIOR TO CEMENTING

Christian W. Breukelman, White Plains, N. Y.

Application July 14, 1955, Serial No. 522,084

7 Claims. (Cl. 166—173)

The invention disclosed in this patent relates to removal of the mud cake deposited on the walls of oil wells during drilling operations.

It is important that this filter cake be removed prior to cementing to accomplish proper bonding of the cement to the bare formation, and it is further desirable that this be effected immediately before cementing so as to avoid any re-deposit of mud from drilling or circulating fluid.

Objects of the present invention are to provide simple, practical and inexpensive means for clearing the bore wall of caked mud or other foreign matter and to accomplish this as a part of or immediately preceding setting and cementing of the casing.

Further important objects of the invention are to provide such means in a form which can be quickly and easily applied to the casing, which will aid in centering the casing in the bore and which will be of such low cost for what it accomplishes that the driller can afford to leave such cleaning means, as must be the case, in the finished well.

Further special objects of the invention are to provide wall cleaning means in the form of scratchers which will reach crevices in the formation in all directions, which will yield and react strongly in passing over projections and uneven surfaces so as to scrape off all adhering material and which will not interfere with or be displaced or injured by normal operations such as in the lifting and lowering of the casing string to release and set slips for addition of new lengths of casing or other purposes, or the rotation of casing.

Other special objects of the invention are to provide wall scratchers which will yield fully to movement in all directions without breaking or becoming deformed and which will hold firmly in place in the mounting means provided therefor even under severe deflection forces.

Additionally it is an important object of the invention to eliminate passages within or under rotating-type scratches which could become conduits for formation fluids after the casing has been cemented in place and thus destroy the effectiveness of the cementation, one of the objects of which is to isolate such fluids.

These and other desirable objects are attained by the novel features of construction, combinations and relations of parts involving in particular the utilization of a rubber-like base for supporting scratcher spikes, which will continue to hold and be fully effective even under extreme pressure conditions encountered in a well, all as hereinafter described in detail and illustrated by way of examples in the accompanying drawings.

A further important feature of the invention is in the use of synthetic adhesives to bond rotating-type scratchers directly to the casing surface at atmospheric or moderate temperatures thereby eliminating the need for welding. In addition to the reduction of cost involved in attaching scratchers to casing by this means instead of by welding methods, there is no danger of reducing the strength of the casing which frequently occurs when the properties of the steel are changed at the locations where welds are made. These adhesives may be used to bond the rubber-like base of rotating type scratchers directly to the casing surface, or to bond metal supports of these scratchers to the casing.

The use of putty-like synthetic cements to attach the metal supports of rotating-type scratchers to the casing surface is also disclosed. These types of cements may be used to fill spaces between rotating-type scratcher bodies and the casing to prevent the flow of formation fluids therethrough after the casing has been cemented in place in a bore hole. Such spaces may not become filled with or blocked with cement during the cementing of casing, and if the scratcher body should be in direct contact with the side of the bore hole, flow of formation fluids therethrough next to the casing surface becomes possible.

The drawings are illustrative of various different embodiments of the invention but as will appear from the following specification, structure may be further modified and changed, all within the true intent and broad scope of the invention as hereinafter defined and claimed.

Fig. 1 in the drawings is a broken side elevation of a length of well casing having a rotary form of scratcher applied thereto;

Fig. 2 is a broken horizontal sectional view showing the casing in a well bore and the scratchers engaging the wall of the bore;

Fig. 3 is an enlarged broken sectional view showing how individual scratcher wires are yieldably mounted by having zigzag or wave form base portions embedded in rubber, thus to enable the wire to rock or roll in and with the rubber;

Fig. 4 is a broken sectional view showing the wire yielding under engagement with a surrounding wall;

Fig. 5 is a broken front elevation of the scratcher structure shown in Figs. 3, 4, 6 and 7;

Fig. 6 is a broken sectional view showing how the shell or cover holding the rubber to the casing may be provided with studs or projections extending through openings in the rubber to hold the latter in position and provide support for the cover against the casing;

Fig. 7 is a broken elevation view of the last illustrated form of rotary scratcher;

Figs. 8 and 9 are broken and somewhat diagrammatic views showing how the scratchers yield upwardly with downward movement of the casing and yield downwardly with upward movement of the casing;

Fig. 10 is a broken side elevation illustrating a ring-type or reciprocating form of scratcher in place on the casing between stop rings;

Figs. 11 and 12 are enlarged horizontal and vertical sectional views on substantially the planes of lines 11—11 and 12—12 of Fig. 10;

Fig. 13 is a broken vertical sectional view and Figs. 14, 15 and 16 are broken horizontal sectional views illustrating different forms of the reciprocating scratchers embedded in the ring of mounting rubber;

Figs. 17 and 18 are broken sectional and front views, respectively, of a rotary form of scratcher construction, and Figs. 19 and 20 are similar views of another such embodiment;

Fig. 21 is a broken sectional view of a rotating scratcher construction in which the shell holding the rubber to the casing is provided with bent-in supporting lugs; this view taken on substantially the plane of line 21—21 of Fig. 23;

Fig. 22 is a broken section on substantially the plane of line 22—22 of Fig. 21, particularly to show the supporting lugs;

Fig. 23 is a broken front view of the construction shown in Figs. 21 and 22.

Fig. 24 is a broken plan view of the rubber strip with embedded wires as used in this last construction.

Figs. 25, 26 and 27 are broken vertical sectional, front elevation and horizontal sectional views of reciprocating forms of scratchers;

Figs. 28, 29, 30, 31, 32 and 33 are broken and part sectional views of another form of rotating scratcher, the sectional views, Figs. 28, 29 and 30, being taken on lines 28—28, 29—29 and 30—30, respectively of the assembled view, Fig. 33;

Figs. 31 and 32 are broken front and broken plan views respectively of the rubber base carrying the projecting wires.

Figs. 34, 35 and 36 are sectional, broken front and broken plan views, respectively, of another rotational form of the scratcher, the sectional view, Fig. 34 being taken on substantially the plane of line 34—34 of Fig. 36.

In all forms of the invention illustrated the scratchers designated 40 are of stiff spring wire or rod bent outwardly at 41 Fig. 3 from a base portion 42 embedded in a strip, pad or cushion 43 of flexible, resilient, rubberlike material directly or indirectly attached to the well casing 44.

A special, important feature is that the embedded root portion of the wire is waved, undulated or bent into zigzag shape, as indicated at 45, to lock it into the rubber and to provide cranks which will resist rotation or axial movement of the wire in the rubber, causing the rubber to drag on and to be dragged by movement of such crank elements.

Figs. 3, 4 and 27 to 30 show the wave form crank elements as extended radially of the pipe approximately in line with the projecting end portions 40 of the wire, whereas Figs. 26 and 36 show the undulations extending longitudinally or more or less parallel with the axis of the casing, each form having advantages. The latter permits of a relatively thin, flat sheet or pad of rubber, whereas the first type requires a thicker body of rubber.

The resilient mounting base which may be of rubber, plastic or other such material and here for convenience referred to as rubber, may be secured to the casing in different ways.

Thus, as shown in Figs. 1 through 6, it may be held against the casing by a confining strip of sheet metal 46 shaped to closely fit over the rubber and secured to the casing by tack welding 47 or a synthetic adhesive.

Fig. 6 shows how the space under the metal cover 51 is completely filled with rubber at this cross-section in order to prevent flow of formation fluids under this cover after the casing has been cemented in the well. This view also shows how the rubber confining strip 46 may be secured to the casing partly or entirely by intermediate studs 48, welded or otherwise fastened to casing and shell and extending through the rubber, thus to anchor the latter more securely.

With the side of the covering strip from which the wires protrude open, as shown in Figs. 3 and 6, the rubber is free to stretch and bend at this edge according to pressure and direction of force applied to the projecting ends, and in order that such movement may be as free as possible, the rubber mounting and cushioning strip may be formed with underlying cross-connected passages 49 between and around the embedded wires.

These preformed passages in the resilient base material also provide means whereby drilling fluids may enter into or escape freely from any cavities which may form in the rubber when the wires are deflected, so that the behavior of rubber in these regions under high hydrostatic pressure will be substantially the same as at atmospheric pressures.

Figs. 3 and 4 show spaces 50 left in back of the rubber strip underneath the inclined sides 51 of the covers which are welded or cemented to the casing, the flow passages 49 extending into these spaces to permit pressures to balance out.

These views also show the inner ends of the wires exposed and extending into the relief passages 50.

Fig. 1 shows how any number of the scratchers may be welded or otherwise attached to the casing in any desired length and position, and Fig. 4 shows how in such relation the projecting ends of the wires will scratch the wall of the bore as the casing is rotated.

Figs. 8 and 9 are intended to show how the wires will yield in one direction or the other in going into or coming out of the hole.

In the reciprocating form of scratcher shown in Figs. 10 to 16, the rubber base 43 is in a sleeve-like form carried by a metal shell 52 having annular confining flanges 53, 54 at top and bottom and shown as having rods 55 connecting these flanges and extending through the rubber pad.

The mounting sleeve may be a continuous ring or be in sections hingedly connected and secured as shown at 56, 57, Fig. 11.

Fig. 13 shows how pressure relief passages 58 may be provided, in this case in the rubber base alongside and in back of the embedded base portions of the wires, and Figs. 14, 15 and 16 show how the embedded portions of the wires may be waved or undulated in different directions and to different extents.

In all such instances the embedded base portion of the wire is deflected or extended divergently to the opposite sides of a general axis of rotation to set up opposing forces in the resilient supporting body which while yielding to superior pressure, will firmly hold the projecting active ends of the wires against the surrounding wall and positively return the scratchers to active projecting position, and all this is accomplished as effectively under conditions of high hydrostatic pressure as under conditions of low or atmospheric pressure.

In all such instances and in other constructions described in this disclosure, fluid may flow in any direction alongside the wires or through the pressure relief passages into any cavities which may form and disappear within or on the surface of the rubber as a result of reversal of deflection of the embedded portions of the wires; thus there is substantially no displacement of rubber into these cavities due to high hydrostatic pressure and no tendency for the wires to be dislodged from their embedment in the rubber or impairment of their tendency to return to their normal positions within the rubber.

Figs. 17 and 18 illustrate a rotating scratcher embodiment in which the base portion 42 of the wire is zigzagged to the extent of an arcuate curvature projecting to opposite sides of a general rotational axis and terminating in an angularly bent end portion 59 exposed at the inner face of the rubber strip.

Figs. 19 and 20 illustrate an embodiment in which the cover strip 46 is formed with an inwardly flanged front wall 60 closed over the outer edge of the rubber but slotted at 61 for free passage and movement of the scratcher wires.

Figs. 21 and 23 illustrate a rotating scratcher construction similar to that last described but in which the front wall 60 of the cover has inwardly angled lug extensions 62 projecting beneath the outer wall of the cover strip and serving as stops supporting the outer wall and limiting the effect of compression forces thereon. These lug extensions also serve to prevent the rubber from "creeping" due to movement of the scratcher wires.

Figs. 22 and 24 show how the rubber base strip 43 in this case may be molded with slots 63 to receive the inturned supporting pillars or lugs 62.

The reciprocating form of scratcher illustrated in Figs. 25 and 26 is similar to that shown in Figs. 10 and 13, in that the embedded base portions 42 of the scratcher wires are undulated longitudinally of the casing, but these views show how the rubber sleeve supporting the wires may be recessed at opposite ends of the wire embedments at 64, 65 to leave the ends of the wires free and exposed in a manner very similar to that employed in the case of the rotating scratchers illustrated in Figs. 24 and 34. The recesses 65 provide greater freedom of movement for the wires during reciprocation of the casing.

Fig. 27 shows the embedded undulations extending radially of the pipe.

Figs. 28 to 33 illustrate a caged-in rubber strip form of rotary scratcher generally similar to that illustrated in Fig. 19 but with the slots 66 in the back wall of the covering strip 46 cut down all the way to the casing so as to give the projecting scratched ends 40 the fullest measure of freedom for scratching the surrounding wall. Lateral movement of the rubber-like material within the covering strip is restricted since the wires embedded therein are anchored against side-wise movement by slots 66. These views also show how the pressure equalizing passages generally designated as 49 may be extended completely about the rubber mounting strip 43, affording greater freedom of flexure for the rubber confined under the covering strip. In Figure 29 it should be noted that the entire cross-section of covering strip 46 is filled with rubber to prevent longitudinal flow of fluids under this strip after the casing has been cemented in the bore hole.

Figs. 34, 35 and 36 illustrate an embodiment in which the rubber mounting strip 43 is bonded or otherwise secured to a base strip 67 curved to the shape of the casing and welded or otherwise attached thereto at the edges, as indicated at 68.

Instead of bonding the rubber to a metallic base to be attached to the casing, the rubber may be directly attached to the casing by cementing or bonding it thereto in other ways. This is the simplest and cheapest way of attaching a rotating-type scratcher to the casing; furthermore by this method there is no possibility of leakage of formation fluids through or under the scratcher assembly after the casing is cemented.

Adherents for cementing or bonding the rubber to the pipe or to the metal base which is attached to the pipe should be such as not to be affected by temperature, pressure and fluids encountered in the well.

Adhesives suitable for the purpose and now available on the market are of the type comprising a plastic resin or its precursors blended with an elastomer which, if desired, for ease of application may be dispersed in a volatile solvent.

This adhesive should be such as can be set or cured by means of heat and/or chemical reaction, retaining a degree of flexibility from the content of elastomer. The setting or curing agents may be dispersed in the adhesive blend as fabricated or may be mixed into the adhesive prior to use, particularly if the curing agent is a chemical reaction or polymerization catalyst or polymerization re-action component.

In the case of the rotary scratcher construction shown in Figs. 34–36, it will usually be preferable and better to bond the rubber during vulcanization to base strip 67 at the factory. The bonding of rubber to metal during vulcanization is a well known process described in the literature, and at present used by many manufacturers. The rubber-to-metal bond can be made as strong as the rubber itself, and the bond will retain its strength at any elevated temperatures which the rubber itself can stand without deterioration.

The previously mentioned cements may also be used to attach cover strip 46 of rotating-type scratchers to the casing, and it will be understood that the edges of these cover strips in contact with the casing may be modified as by extended flanges to provide as much surface area in contact with the casing as is necessary to provide good adhesion. For instance, the welding lugs shown at 47 in Figs. 1 and 2 may be extended longitudinally to provide a continuous cemented connection.

Putty-like synthetic cements and sealers are available on the market which may be used to advantage under certain conditions. These cements may be used either as adhesives or as sealers to block passages between metal parts of rotating-type scratchers and the casing which might otherwise become conduits for formation fluids after the casing has been cemented in the well. For example, if base strip 67 of Fig. 34 is curved to fit a small diameter casing, but is attached to a larger diameter casing, the longitudinal conduit which then exists between the base strip and the casing may be blocked with these types of cement.

The adhesive used in these applications may be selected from any of the types identified. In such applications, a relatively thick layer of adhesive may be desired. The adhesive chosen, therefore, should be of the type containing inert fillers or bulking agents which may also have properties of reinforcing or hardening the adhesive film.

Adhesives may also be used to attach the rubber sleeve 43 of the reciprocating-type scratchers shown in Figs. 1 and 25 to the metal shell 52 which is slidable on the casing.

Only a few adhesives which are known to be suitable for the attachment of scratchers to casing have been mentioned, but others are available and more and improved ones may be developed by industry.

It may be observed at this point that some curing of adhesives may take place in the well under the elevated temperature and high hydrostatic pressure prevailing at depth. These conditions of temperature and pressure increase gradually over the period of time during which the casing is lowered into the well.

In forms of the invention like those shown in Figs. 3, 17, 21 and 28 where the inner face of the rubber directly engages the casing, a bonding cement may be applied to the face of the rubber or to the casing, or to both, before pressing the scratcher in place against the pipe. This cement then assists the overlying welded-on or cemented-on cover in permanently securing the scratcher to the casing.

Thus the adherent may be used as the sole securing means or be used in conjunction with the welded-on or cemented-on cover, or the latter may be employed as the sole securing means.

Tack welding at separated points is normal procedure but when adhesives are used the cemented connections should usually be continuous.

In the form shown in Fig. 21 the inturned lugs 62 which brace and support the cover strip 46 may be welded at either or both ends to the body of the strip and the casing.

In using the reciprocating forms of scratchers such as shown in Figs. 10 and 25, stop rings may be welded or otherwise secured on the pipe above and below the scratcher sleeves, as indicated at 69, Fig. 10.

The rubber may be in the form of a relatively thin, flat pad of not much greater thickness than the extent of undulations in the embedded base portions of the wire. Particularly is this true where the spread of the undulations is in the general flat plane of the pad, as in Figs. 34 and 36.

It should be noted that in the case of all rotating type scratchers described, if the casing presses against the wall of the bore hole, the scratcher wires will deflect to such an extent that the cover over the rubber or the rubber itself will come into contact with the bore hole wall, thus protecting the wires at the points where they emerge from the rubber, and only the extremities of the wires press against the bore hole wall. Thus the scratcher wires cannot be damaged or be torn out of their embedment in the rubber; yet they retain some angular relationship with the bore hole wall and hence their scratching action.

The wire may be smooth and of the same continuous uniform diameter without heads or other enlargements which might give rise to end-wise pressure displacing forces due to flow of fluids or rubber under high hydrostatic pressure back of such enlargements.

While wires of circular cross-section have been generally used, it is contemplated that wires of oval or square cross-section or other shapes may be employed.

With undulations extending to opposite sides of an intermediate general axis of rotation, as shown for example in Figs. 3, 19, 27 and 28, the wire is held against longitudinal displacement, particularly so with opposite ends of the embedded portion both exposed to the same pressure, and these double or multiple bends serve as offset cranks or levers, resisting twisting effort applied to the projecting and relatively angularly ertending free ends of the wires.

The construction in each case is strong and durable, easily applied to the casing and inexpensive considering results accomplished.

The resiliency of the rubber and the elasticity of the wires coact as conditions change to hold the wire ends firmly against the surrounding wall formation and to center the casing in the hole. The relief grooves and holes in the rubber equalize hydrostatic pressure around and in the locality of each wire, permitting cavitation of the rubber under conditions of high hydrostatic pressure. This construction has the advantage over straight or headed pins embedded in rubber without such pressure relieving means as the latter can be forced out of the rubber by displacement or cold flow of the rubber under their embedded extremities under high hydrostatic pressure with repeated extreme deflection of the pins.

In this invention, even with maximum deflection of the wires, the action on the rubber is mild and there is no permanent deformation of the rubber.

It will be understood that in cases where there is sufficient clearance between the casing and the walls of the bore hole, relatively thick rubber pads may be used, and in such case the provision of passages 49 for the purpose of providing better freedom of movement for the rubber and embedded portions of the wires during flexure may be unnecessary. Thus in the case of Fig. 34 for example it will be possible to eliminate the portion of relief passage 49 under wire 40 where well conditions and quality of rubber permit.

What is claimed is:

1. Scratcher for cleaning the wall of a bore hole comprising, a layer of permanently resilent material, means for attaching the same in flat relation on the outer surface of a tubing to be inserted into the bore hole and stiff spring scratcher wire having a portion extending in a direction generally tangential to the wall of the tubing and having a transversely extending, permanently bent portion embedded in the resilient material and forming a crank restraining rotative movement of the wire in the material, said wire having a free, wall scratching end portion projecting away from that portion of the wire embedded in the resilient material in a direction generally tangential to and thence substantially radially away from the wall of the tubing and in a plane normal to the tubing axis, said material by engagement with said transversely bent portion normally holding the wire with the free end portion projecting as described but resiliently yieldable to rocking movements of said transversely bent portion embedded in the material occasioned by pressure and frictional engagement of the extremity of the projecting end portion against the bore wall and movements of the tubing wtihin the bore hole causing changes in the direction and amount of deflection of said end portion from its normal position, thus to pressurize the extremity of said projecting end portion against the bore wall and to resiliently restrain movement of the exterior wall scratching portion of the wire out of the plane normal to the tubing axis.

2. The invention according to claim 1 in which the transversely bent embedded portion of the wire has limited freedom of movement relative to and within said resilient material.

3. The invention according to claim 1 in which both ends of the wire at opposite sides of said transversely bent embedded portion are free of the resilient material.

4. The invention according to claim 3 in which the transversely bent embedded portion of the wire has limited freedom of movement relative to and within said resilient material.

5. The invention according to claim 1 in which the embedded portion of the wire is exposed at an intermediate point to a permanently open conduit extending through said material to its outer surface.

6. The invention according to claim 1, in which the layer of permanently resilient material is applied directly to the wall of the tubing and in which said means for attaching the same comprises a compatible, synthetic plastic resistant to temperature, pressure and fluids encountered in the well.

7. The invention according to claim 1, in which said means for attaching said layer of permanently resilient material comprises a compatible synthetic plastic resistant to temperature, pressure and fluids encountered in the well.

References Cited in the file of this patent

UNITED STATES PATENTS

| | | |
|---|---|---|
| 1,199,148 | Bemis | Sept. 26, 1916 |
| 2,402,223 | Wright | June 18, 1946 |
| 2,634,813 | Wright | Apr. 14, 1953 |
| 2,671,515 | Hall | Mar. 9, 1954 |
| 2,713,912 | Baker | July 26, 1955 |

UNITED STATES PATENT OFFICE

CERTIFICATE OF CORRECTION

Patent No. 2,832,420                                April 29, 1958

Christian W. Breukelman

It is hereby certified that error appears in the above numbered patent requiring correction and that the said Letters Patent should read as corrected below.

In the heading to each of the four sheets of drawings, for "Filed Feb. 14, 1955", each occurrence, read -- Filed July 14, 1955 --.

Signed and sealed this 21st day of April 1964.

(SEAL)
Attest:
ERNEST W. SWIDER                                EDWARD J. BRENNER Attesting Officer                                  Commissioner of Patents